United States Patent [19]

Fry et al.

[11] Patent Number: 4,875,000
[45] Date of Patent: Oct. 17, 1989

[54] CURRENT FAULT DETECTION SYSTEM AND METHOD FOR AC CONTROLLER

[75] Inventors: John J. Fry, Wickliffe; John W. Robertson, Jr., Chesterland; Edward Bastijanic, Concord, all of Ohio

[73] Assignee: The Babcock & Wilcox Company, New Orleans, La.

[21] Appl. No.: 233,929

[22] Filed: Aug. 10, 1988

Related U.S. Application Data

[63] Continuation of Ser. No. 935,353, Nov. 26, 1986, abandoned.

[51] Int. Cl.⁴ .............................................. H02P 5/40
[52] U.S. Cl. .................................... 318/798; 318/806; 363/58
[58] Field of Search ................................. 363/56–58; 318/798, 806

[56] References Cited

U.S. PATENT DOCUMENTS

| | | | |
|---|---|---|---|
| 3,046,412 | 7/1962 | Seike | 363/56 |
| 3,775,651 | 11/1973 | Graf et al. | 318/802 |
| 4,333,642 | 6/1982 | Kawada et al. | 318/811 |
| 4,356,544 | 10/1982 | Ono et al. | 318/811 |
| 4,371,824 | 2/1983 | Gritter | 363/56 |
| 4,447,786 | 5/1984 | Saar et al. | 318/811 |
| 4,672,286 | 6/1987 | Williams | 318/806 |

*Primary Examiner*—David Smith, Jr.
*Attorney, Agent, or Firm*—Vytas R. Matas; Robert J. Edwards

[57] ABSTRACT

An overcurrent protection system for AC motor control systems which provides a separate overcurrent shut down mechanism for each phase of the AC power used in an AC motor. These separate phase shutdown mechanisms provide protection for minor overcurrent conditions without shutting down the entire motor control system. The overcurrent protection system also provides a mechanical feedback apparatus for totally shutting down the motor control system only in a severe overcurrent condition.

5 Claims, 3 Drawing Sheets

CURRENT FAULT DETECTION SYSTEM AND METHOD FOR AC CONTROLLER

This is a continuation of co-pending application Ser. No. 06/935,353 filed on Nov. 26, 1986 now abandoned.

BACKGROUND OF THE INVENTION

1. Field of the Invention

The present invention relates generally to controllers for machines which operate on alternating current and particularly to current fault detection systems for AC machine controllers.

2. Description of Prior Art

Machines which are powered by alternating current (AC) are used extensively in areas such as, industry, home appliances, recreation, etc. The most common of such AC machines is a motor. Many AC motors are able to use multiple phase AC power.

Most multiphase motors are equipped with controllers which alter certain motor operating parameters, such as motor speed or torque, to fit a particular motor to the demands of the load to which it is being applied. These controllers are most often electronic controlling devices which allow more or less electrical power to the motor using known power limiting methods. These electronic controlling devices are very susceptible to current overloads, and therefore severe damage, as the motor demands high levels of power to drive an extremely demanding load.

Two methods are presently used to prevent damage to electronic motor controllers during a current overload condition. One method senses the position of the assembly which is being driven by the motor, such as an actuator arm or jackshaft, and relates that to the time taken to move to the new position. The ratio of change in position to time infers whether a current overload is occurring. If the ratio becomes too small it signals that a current overload is occurring and the motor controller is shut down by the protection system.

The motor or actuator arm positioning method is inexpensive and easily adapted to most positioning applications, however, it also has shortcomings. The protection of this type of overcurrent protection is limited to the time of mechanical feedback from the actuator arm or jackshaft, and electronic overload damage often occurs before the feedback time has elapsed. Also, an overload situation may occur which is not related to the mechanical position of the load, such as, a short circuit in the wiring or a short in the winding of the motor. Due to these limitations, the mechanical feedback overload system does not provide adequate protection to electronic motor controllers.

The second method presently used to protect a motor controller from over current damage is to provide direct current measurement of each phase of the motor being controlled and to shut down the entire motor control system if any of the phase currents go above a preset safety level as provided in FIG. 1. The signals from each current sensing device are input through a logical OR gate to a digital controller. If a digital high signal is sent to the digital controller from the OR gate, the digital controller sends a system shut down signal to the motor and motor controller.

In this overcurrent protection system each current sensor communicates with the digital controller. However, the digital controller must be protected from the surges of power which commonly occur in the motor control system. The presence of these power surges demand that there be ground isolation between the each current sensing device and the digital controller. Ground isolation is usually accomplished through known opto-isolators, as shown in FIG. 1, which are expensive. Also when any of the phase currents of the motor goes above the threshold safety level the entire system is shut down until reset by an operator. Often this entire motor system down time is unnecessary because only one phase of the motor is in an overcurrent state, and a 3-phase motor can usually continue running on two phase power.

Thus it is seen that a current overload protection system for 3-phase motors is needed which does not shut down the entire motor control system in an single phase, overcurrent condition yet provides adequate protection to the motor control system in an inexpensive manner.

SUMMARY OF THE INVENTION

The present invention described herein overcomes all the prior art problems associated with the mechanical feedback and direct current measurement methods of overcurrent protection of AC motor control systems. The invention accomplishes this by providing a separate overcurrent shut down mechanism for each phase of AC power used in an AC motor.

This new overcurrent protection system provides a separate shut-down mechanism for each phase of the power supplied to the AC motor without being controlled by or sending a shut down signal to the digital controller. A single phase of the 3-phase power may be shut down by the system temporarily without shutting down the entire AC motor control system. However, the overcurrent protection system is also provided with a mechanical feedback apparatus which sends a total shut down signal to the digital controller only if the AC motor stalls to provide protection for the most severe overcurrent conditions. The operator must then reset the system manually. Thus each phase of power is protected from temporary or minor overcurrent conditions without a total system shutdown, however, the entire system is completely shutdown in the event of a severe overcurrent condition.

Thus one aspect of the invention is to provide an overcurrent protection system for AC motors which does not shut down the entire AC motor control system for a minor or temporary overcurrent condition yet shuts the entire system down for severe overcurrent conditions.

Another aspect of the present invention is to provide an overcurrent protection system for AC motors whereby each individual phase of AC power is provided with its own overcurrent protection mechanism independent of the rest of the protection system.

Yet another aspect of the present invention is to provide an overcurrent protection system for an AC motor control system whereby each independent phase overcurrent protection mechanism is in no way linked to a digital control device.

Yet another aspect of the present invention is to provide a low-cost overcurrent protection system for an AC motor control system.

DESCRIPTION OF PREFERRED EMBODIMENT

Figure 1:
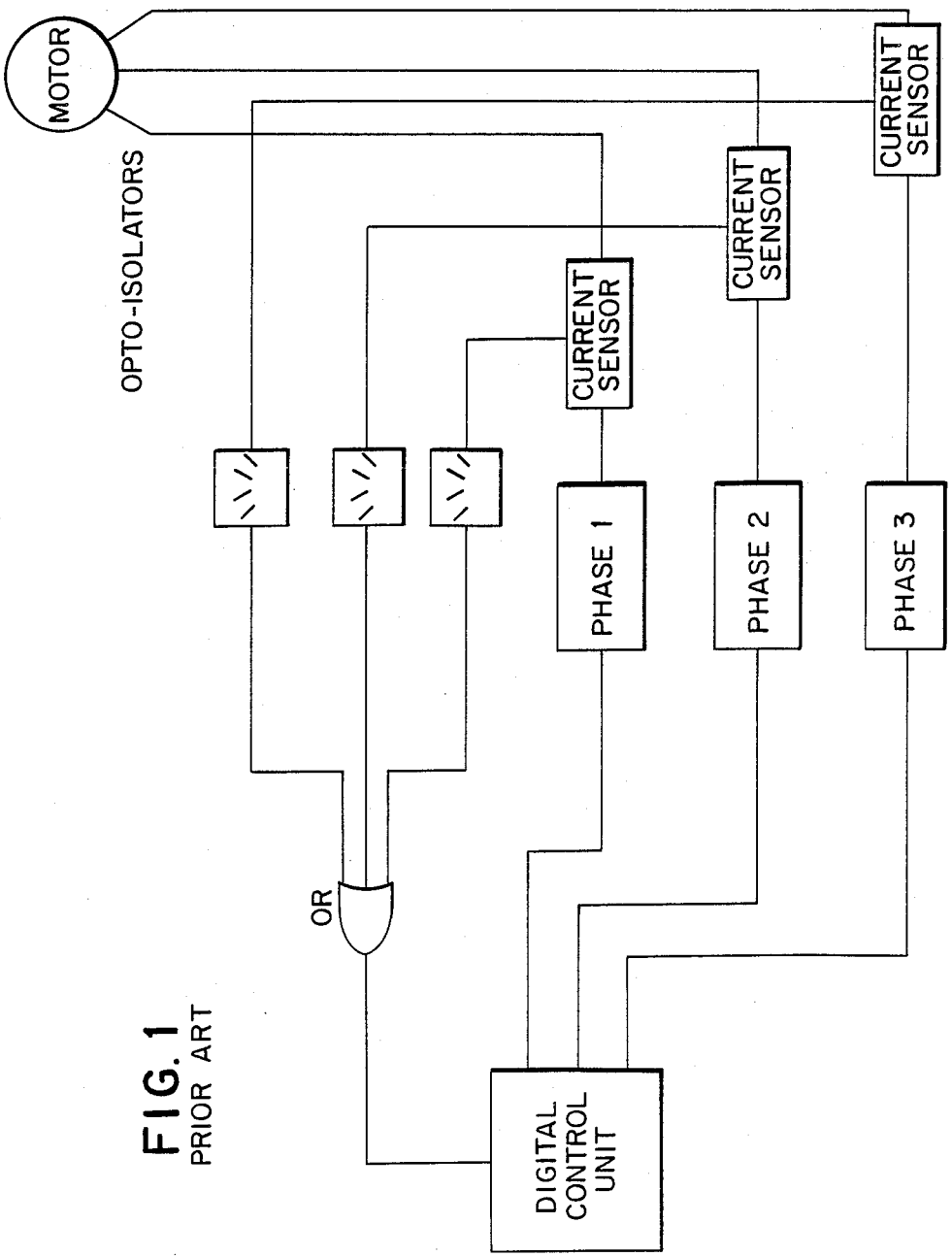
FIG. 1 is a schematic drawing of a prior art direct current measurement, overcurrent protection system.
Figure 2:
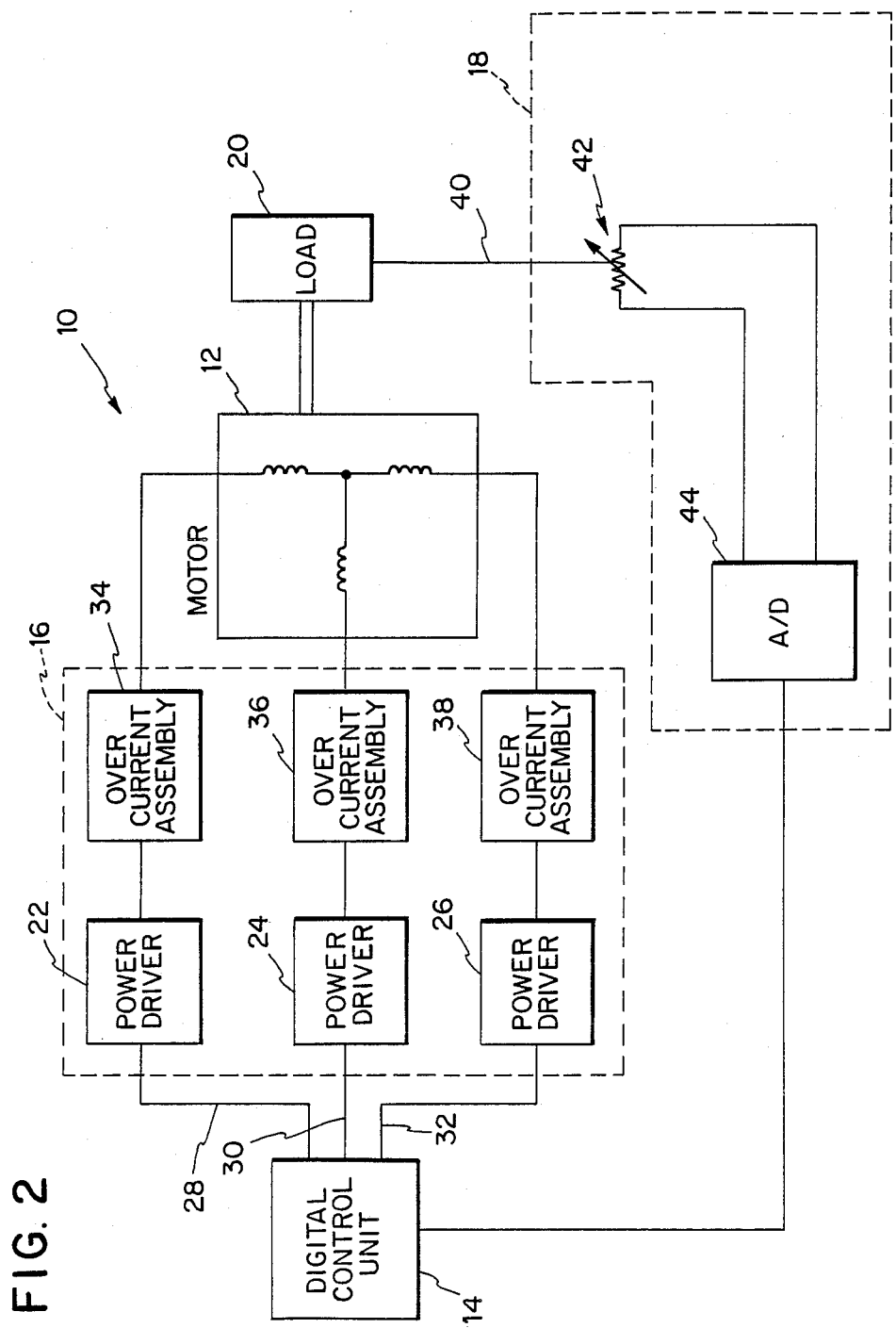
FIG. 2 is a schematic drawing of an overcurrent protection system for AC motors using an individual overcurrent protection assembly for each phase of AC power.

Referring now to the drawings generally with particular reference to FIG. 2, a motor controller overcurrent protection system 10 is provided including a 3-phase AC motor 12, a digital control unit 14, and a 3-phase AC power system 16. The overcurrent protection system 10 further includes a mechanical feedback system 18 connected to a load 20 driven by the motor 12.

The digital control unit 14 is connected to power drivers 22,24,26 of AC power system 16 along three lines 28,30,32 respectively. The power drivers 22,24,26 are then connected to overcurrent protection assemblies 34,36,38 respectively. The overcurrent protection assemblies 34,36,38 are input to the motor 12.

The mechanical feedback system 18 includes a feedback member 40 connected to the load 20 and a feedback transducer 42 attached to the member 40. The transducer 42 is connected to an analog-to-digital convertor 44 which is in turn connected to the digital control unit 14.

In operation the digital control unit 14 sends digital pulses along lines 28,30,32 which enable each of the power drivers 22,24,26 to generate single phase alternating current. Digital control unit 14 is a known microprocessor which is able to store and execute control algorithms. The AC current produced by each power driver 22,24,26 is monitored by its own respective overcurrent protection assembly 34,36,38. The three AC currents are input to the motor 12 where together they become the 3-phase power required to run the motor. The operation of the power drivers 22,24,26 and the overcurrent protection assemblies are discussed below.

If the AC current level of any one of the power drivers 22,24,26 surpasses a threshold safety level its respective overcurrent protection assembly 34,36,38 does not allow the power driver to produce AC current. After a preset time period the power driver 22,24,26 again begins producing AC current and if the overcurrent condition is still apparent it again is disallowed from producing AC current.

The overcurrent devices 34,36,38 operate separately allowing any of the power drivers 22,24,26 to be prevented from producing AC current while the other two power drivers are still operating. The entire system is able to maintain operation if the overcurrent condition is minor because often a 3-phase motor will continue operation on two phase power. No down time is then experienced due to a minor or temporary overcurrent condition in the controls of a single phase of the three phase power output to the motor.

If a severe overcurrent condition exists two or all three of the overcurrent assemblies 34,36,38 will prevent their respective power drivers 22,24,26 to operate. As each phase of the 3-phase motor is removed, the motor's 12 potential to stall becomes greater depending upon the magnitude of the load 20. When the motor does stall it is sensed by the transducer 42 through the cessation of movement by feedback member 40. Transducer 42 is a variable resistance potentiometer with its wiper attached to the feedback member 40. Feedback member 40 is a mechanical linkage to the load 20 such as an actuator arm attached to a damper in an airduct (not shown). The A/D convertor 44 is a known analog to digital conversion circuit which converts the position of transducer 42 to digital pulses and transmits them to the digital control unit 14.

If the feedback member 40 remains in a fixed position for a set period of time as sensed by the digital control unit 14 through transducer 42 and A/D convertor 44, indicating a stalled condition, the entire system is shut down by the digital control unit 14. This fixed period of time is usually 7 seconds. An operator then must reset the motor controller system 10 after investigating and correcting the severe overcurrent condition. This provides an entire system shutdown if the digital control unit 14 enables the motor control system 10 and the motor 12 is in a stalled condition or an extreme overcurrent condition exists in the AC power system 16.

Figure 3:
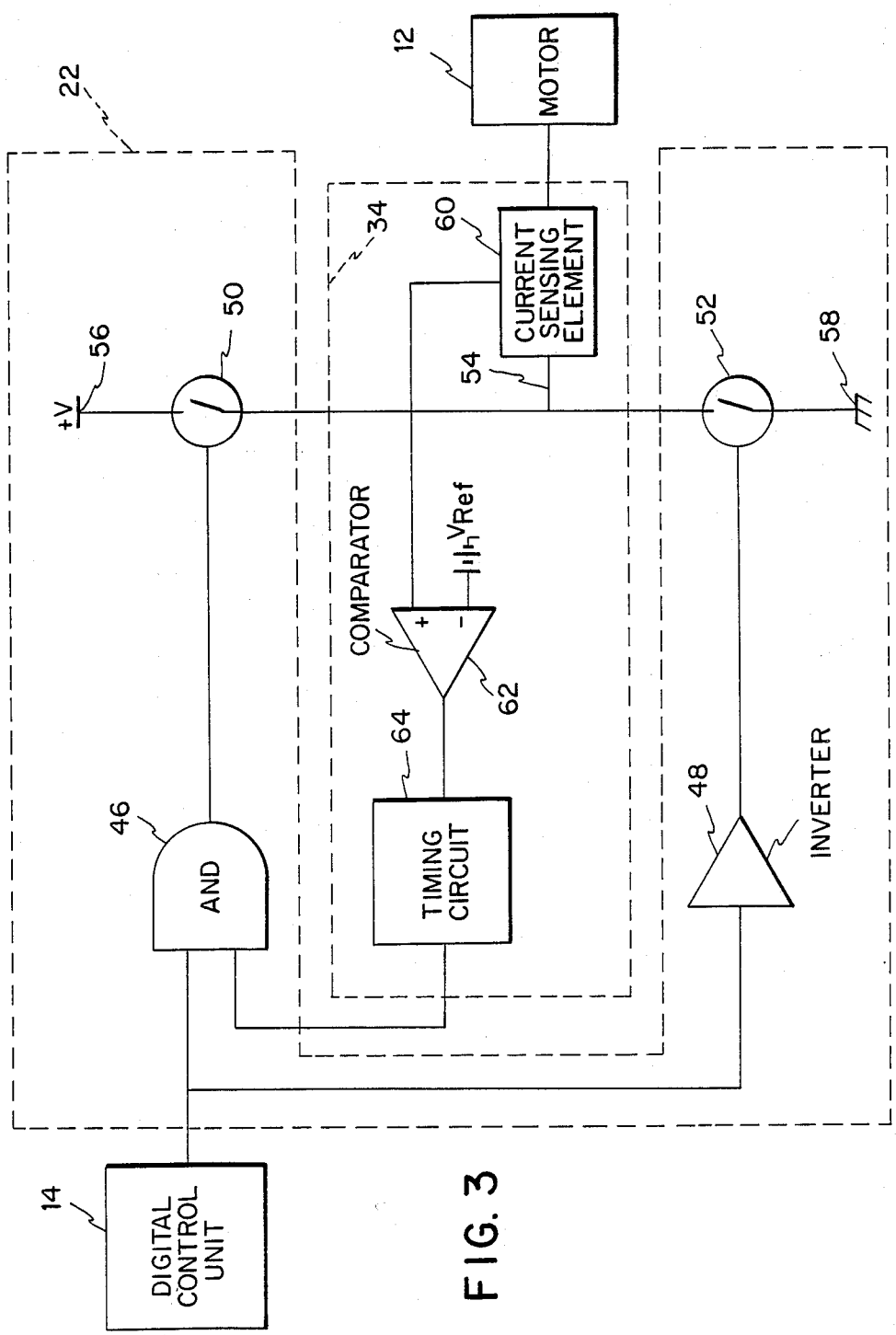
FIG. 3 is a schematic drawing of the individual overcurrent protection assemblies of FIG. 2.

Referring now to FIG. 3 a schematic diagram of one of the overcurrent assemblies 34,36,38 (hereafter 34) is provided along with one of the power drivers 22,24,26 (hereafter 22). In normal operation of the power driver 22 the digital control unit 14 sends the same digital pulses to an AND gate 46 and INVERTER gate 48 of the power drivers 22. Gates 46 and 48 are formed by known integrated circuits commonly found in semiconductor chips. Normally the second input of AND gate 46 is logical high, therefore the logical output of AND gate 46 is normally opposite of the logical output of INVERTER gate 48. The outputs of the gates 46 and 48 are sent to known MOSFET power switches 50 and 52, respectively. The MOSFETs 50,52 are enabled alternately by the signals sent from gates 46 and 48 creating an alternating current on line 54 from DC power supply 56 and common 58.

Overcurrent assembly 34 includes a current sensing element 60 connected to one input of a known operational amplifier comparator circuit 62. The comparator 62 is connected to a known RC timing circuit 64 which is connected to the second input of the AND gate 46. The current sensing element 60 may be any known current sensing device, such as a Hall effect sensor or a current sensing resistor.

In operation current sensing element 60 senses the level of current being output by power driver 22 and sends a voltage signal indicative of the current level to the positive input of comparator 62. The negative input of comparator 62 is connected to a safety reference voltage. If the voltage level from current sensing element 60 exceeds the safety reference voltage then comparator 62 outputs an energize signal to timing circuit 64.

In normal operation timing circuit 64 outputs a constant digital high signal to AND gate 46, enabling power driver 22, however, when timing circuit 64 is energized by comparator 62 it will output a digital low signal to AND gate 46, disabling the power driver 22. The timing circuit normally disables the power driver for 20 seconds and then the power driver goes back on line. Hence, power driver 22, which creates one phase of the 3-phase AC power, is disabled separately from the other 2 power drivers 24 and 26 without being controlled by digital controller 14.

While specific embodiments of the invention have been shown and described in detail to illustrate the application of the principles of the invention, it will be understood that the invention may be embodied otherwise without departing from such principles.

What is claimed is:

1. An overcurrent fault detection system for multiphase AC motor control systems comprising:
   digital control means for controlling the motor control system through digital pulses;
   multiphase AC power generation means connected to said digital control means for supplying AC multiphase power to a motor, said power generation means including a separate power driving means for generating each phase of the multiphase power and an overcurrent detection means for each phase of said multiphase power permitting an individual power phase to be disabled without disabling the other power phases, each of said power driving means including an AND gate and inverter means, said AND gate and said inverter means each receiving the same signals from said digital control means and producing digital signals that are opposite to each other in logic value, each of said overcurrent detection means including means for sensing the electrical current passing through said individual power phase and producing a signal representative thereof, means for comparing said signal produced by said current sensing means with a signal having a pre-determined magnitude and producing an output signal if the magnitude of said signal produced by said current sensing means exceeds the magnitude of said pre-determined signal, and timing means connecting the output of said comparing means to an input of said AND gate, said timing means receiving said output signal produced by said comparing means and producing a signal for disabling said individual power phase for a first pre-determined period of time; and
   mechanical feedback means attached through a load to the motor to disable the entire motor control system through said digital control means if the motor stalls for a second pre-determined period of time indicating the existence of a severe overcurrent condition in the motor control system.

2. The system as defined in claim 1 wherein said mechanical feedback means includes a mechanical transducer which senses movement and converts said movement into an analog signal, and an analog to digital converter which converts said analog signal into a digital signal for transmission to said digital control means.

3. The system as defined in claim 1 wherein said digital control means is a microprocessor.

4. The system as defined in claim 1 wherein each of said power driving means further includes two switches, one of said switches receiving said digital signals produced by said AND gate, the other of said switches receiving said digital signals produced by said inverter means, said switches producing AC current from a DC power supply and a common by switching in response to said digital signals respectively applied thereto.

5. An overcurrent fault detection system for multiphase AC motor control systems comprising:
   digital control means for controlling the motor control system through digital pulses;
   multiphase AC power generation means connected to said digital control means for supplying AC multiphase power to a motor, said power generation means including separate power driving means for generating each phase of the multiphase power and an overcurrent detection means for each phase of said multiphase power permitting an individual power phase to be disabled without disabling the other power phases, each of said power driving means including an AND gate and inverter means and two switches, said AND gate and inverter means each receiving the same signals from said digital control means and producing digital signals that are opposite to each other in logic value, one of said switches receiving said digital signals produced by said AND gate, the other of said switches receiving said digital signals produced by said inverter means, said switches producing AC current from a DC power supply and a common by switching in response to said digital signals respectively applied thereto, each of said overcurrent detection means including means for sensing the electrical current passing through said individual power phase and producing a signal representative thereof, means for comparing said signal produced by said current sensing means with a signal having a pre-determined magnitude and producing an output signal if the magnitude of said signal produced by said current sensing means exceeds the magnitude of said pre-determined signal, and timing means connecting the output of said comparing means to an input of said AND gate, said timing means receiving said output signal produced by said comparing means and producing a signal for disabling said individual power phase for a first pre-determined period of time; and
   mechanical feedback means attached through a load to the motor to disable the entire motor control system through said control means if the motor stalls for a second pre-determined period of time indicating the existence of a severe overcurrent condition in the motor control system.

* * * * *